US006888700B2

(12) United States Patent
Litvinov et al.

(10) Patent No.: US 6,888,700 B2
(45) Date of Patent: May 3, 2005

(54) PERPENDICULAR MAGNETIC RECORDING APPARATUS FOR IMPROVED PLAYBACK RESOLUTION HAVING FLUX GENERATING ELEMENTS PROXIMATE THE READ ELEMENT

(75) Inventors: Dmitri Litvinov, Pittsburgh, PA (US); Sakhrat Khizroev, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 241 days.

(21) Appl. No.: 10/022,712

(22) Filed: Dec. 17, 2001

(65) Prior Publication Data

US 2003/0016469 A1 Jan. 23, 2003

Related U.S. Application Data

(60) Provisional application No. 60/306,802, filed on Jul. 20, 2001.

(51) Int. Cl.$^7$ .............................................. G11B 5/127
(52) U.S. Cl. ..................................................... 360/125
(58) Field of Search ................................ 360/125, 122, 360/318, 318.1

(56) References Cited

U.S. PATENT DOCUMENTS

| 3,921,217 | A | * | 11/1975 | Thompson | ................... | 360/321 |
|---|---|---|---|---|---|---|
| 4,385,334 | A | * | 5/1983 | Yanagida | ................... | 360/125 |
| 4,541,026 | A | | 9/1985 | Bonin et al. | | |
| 4,731,157 | A | * | 3/1988 | Lazzari | ...................... | 216/22 |
| 4,751,598 | A | | 6/1988 | Hamilton | | |
| 4,771,350 | A | | 9/1988 | Desserre | | |
| 4,897,749 | A | | 1/1990 | Perlov et al. | | |
| 5,047,884 | A | | 9/1991 | Negishi et al. | | |
| 5,073,836 | A | | 12/1991 | Gill et al. | | |
| RE33,949 | E | | 6/1992 | Mallary et al. | | |
| 5,168,408 | A | * | 12/1992 | Lazzari | ................... | 360/318.1 |
| 5,196,976 | A | | 3/1993 | Lazzari | | |
| 5,717,551 | A | | 2/1998 | Negishi et al. | | |
| 5,995,340 | A | * | 11/1999 | Ha | ............................. | 360/121 |
| 6,008,969 | A | | 12/1999 | Imai et al. | | |

OTHER PUBLICATIONS

D. Litvinov et al., "Micromagnetics of a Soft Underlayer", *IEEE Trans. On Magn.,* vol. 36, No. 5, pp. 2483–2485 (2000).

S. Khizroev et al., "Recording Heads with Track Widths Suitable for 100 Gbit/in$^2$ Density", *IEEE Trans. On Magn.,* vol. 35, No. 5, pp. 2544–2546 (1999).

* cited by examiner

*Primary Examiner*—David Davis
(74) *Attorney, Agent, or Firm*—Robert P. Lenart, Esq.; Piatragallo, Bosick & Gordon

(57) ABSTRACT

A perpendicular magnetic recording head for improving resolution includes a read element and a magnetic flux generating element spaced apart from the read element. The magnetic flux generating element transmits a magnetic flux into a soft magnetic underlayer of a magnetic recording medium adjacent an air-bearing surface of the magnetic flux generating element. The magnetic flux transmitted to the soft magnetic underlayer flows in the soft magnetic underlayer away from an area of the soft magnetic underlayer beneath the read element.

17 Claims, 5 Drawing Sheets

PERPENDICULAR MAGNETIC RECORDING APPARATUS FOR IMPROVED PLAYBACK RESOLUTION HAVING FLUX GENERATING ELEMENTS PROXIMATE THE READ ELEMENT

CROSS REFERENCE TO RELATED APPLICATION

This application claims the benefit of U.S. Provisional Application No. 60/306,802 filed Jul. 20, 2001.

FIELD OF THE INVENTION

The present invention relates to perpendicular magnetic recording heads, and more particularly, relates to perpendicular magnetic recording heads for improving resolution of the recording head.

BACKGROUND OF THE INVENTION

Perpendicular magnetic recording systems have been developed for use in computer hard disc drives. An approach to perpendicular magnetic recording requires the use of recording media with a magnetically soft underlayer which provides a flux path from the trailing pole to the leading pole of the writer. The soft underlayer enables substantially stronger fields than can be generated with a ring head in conventional longitudinal recording systems. The soft underlayer also provides sharper field gradients which enable writing on high coercivity media. In addition, the soft underlayer also affects the recording head during a read operation. During the read back process, the soft magnetic underlayer produces the image of magnetic charges in the magnetic hard layer. It has been determined that there is asymmetry between the recording head and its image with respect to the recording layer. Accordingly, it has further been determined that due to this asymmetry, resolution of a perpendicular magnetic recording system with a soft underlayer is usually never better than resolution of an equivalent system without a soft underlayer.

The trend in the data storage industry has been to develop magnetic recording systems having high density recording capabilities. Perpendicular recording designs have the potential to support much higher recording densities than conventional longitudinal designs for various reasons. However, the described fundamental resolution degradation due to the use of a soft magnetic underlayer is not a desirable feature because it limits high density recording in a perpendicular magnetic recording system that utilizes a soft underlayer.

There is identified, therefore, a need for an improved perpendicular magnetic recording head which overcomes disadvantages, limitations, or shortcomings of known perpendicular magnetic recording heads.

SUMMARY OF THE INVENTION

Embodiments of the invention meet the identified need, as well as other needs, as will be appreciated following a review of this specification and drawings.

In accordance with an aspect of the invention, a perpendicular magnetic recording head for use with a magnetic recording medium to improve resolution of the recording head comprises a read element having a first side and a second side, a first magnetic flux generating element and a second magnetic flux generating element. The first magnetic flux generating element is spaced apart from the first side of the read element and transmits a magnetic flux into a soft magnetic underlayer of the recording medium adjacent an air-bearing surface of the first magnetic flux generating element. The second magnetic flux generating element is spaced apart from the second side of the read element and transmits a magnetic flux into the soft magnetic underlayer adjacent an air-bearing surface of the second magnetic flux generating element. In accordance with the invention, the magnetic flux transmitted to the soft magnetic underlayer by the first magnetic flux generating element flows in an opposite direction within the soft magnetic underlayer than does the flow of the magnetic flux transmitted to the soft magnetic underlayer by the second magnetic flux generating element. This allows for the flux transmitted to the soft magnetic underlayer to flow into the soft magnetic underlayer away from an area of the soft magnetic underlayer beneath the read element, which improves the playback resolution of the recording head.

The first magnetic flux generating element may include an inner magnetic element and an outer magnetic element. The inner magnetic element may be spaced apart from the first side of the read element and positioned between the read element and the outer magnetic element. The first magnetic flux generating element may further include a yoke that magnetically connects the inner magnetic element and the outer magnetic element to establish a flux path within the first magnetic generating element.

The second magnetic flux generating element may include an inner magnetic element and an outer magnetic element. The inner magnetic element may be spaced apart from the second side of the read element and positioned between the read element and the outer magnetic element. The second magnetic flux generating element may further include a yoke that magnetically connects the inner magnetic element and the outer magnetic element to establish a flux path within the second magnetic generating element.

In accordance with an additional aspect of the invention, the perpendicular magnetic recording head comprises a read element and means for generating a magnetic flux which improves resolution during operation of the read element. The means for generating a magnetic flux may include at least one magnetic flux generating element spaced apart from the read element. In addition, the magnetic flux generating element may be at least partially circumferentially disposed about the read element. For example, the magnetic flux generating element may be circular, or a similar type shape, for at least partially surrounding the read element.

In accordance with yet an additional aspect of the invention, a magnetic disc drive storage system comprises a housing, a magnetic recording medium having a hard magnetic recording layer and a soft magnetic underlayer, and a perpendicular magnetic recording head constructed in accordance with the invention.

DETAILED DESCRIPTION OF THE INVENTION

The invention provides a perpendicular magnetic recording head for improving the resolution of the recording head. Resolution of a read head is defined by the smallest bit size the read head is capable to distinguish. Therefore, the better the resolution of the head, the smaller bit size the head can distinguish. Consequently, the better the resolution of the head, the larger data density that can be read back from a disc. It is understood that the resolution is a characteristic of a read head itself. For example, the thinner the playback head (or the smaller the separation between two shields around a read element (magnetoresistive (MR) or giant magnetoresistive (GMR) or another)), the smaller bit size the head can distinguish, which, in turn, implies the better resolution. But there are other factors, besides the thickness of the read element and the separation between the two shields, that influence the resolution. For example, head resolution depends also on other geometrical features of the head, such as cross-section at the air-bearing surface (ABS) and its aspect ratio. In addition, factors other than ones directly associated with the head, for example, a smaller flying height and a thinner recording layer also imply better resolution.

The invention is particularly suitable for use with a magnetic disc drive storage system. A recording head or magnetic recording head, as used herein, is defined as a head capable of performing read and/or write operations, wherein the invention is particularly directed toward the reader portion of a magnetic recording head.

Figure 1:
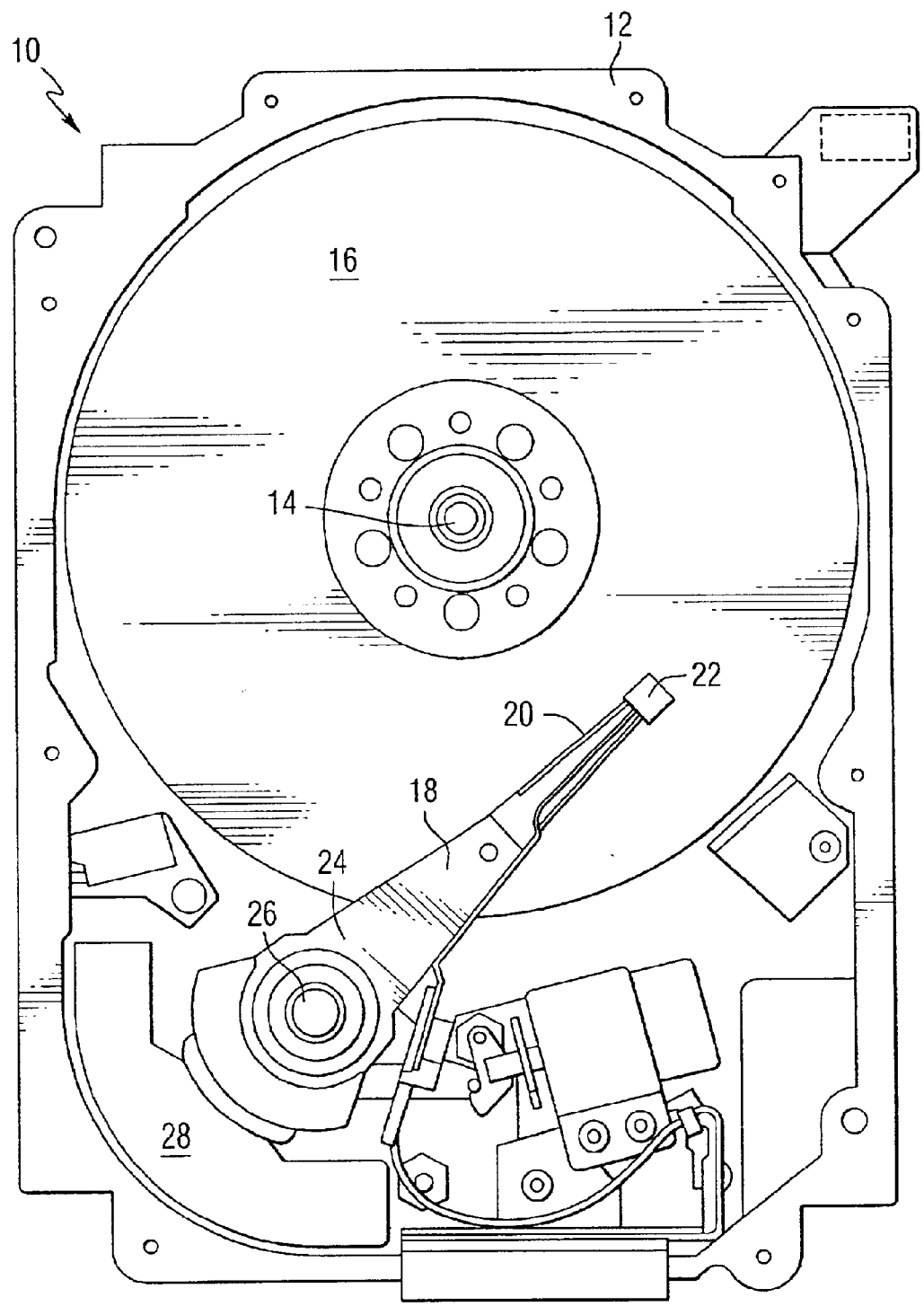
FIG. 1 is a pictorial representation of a magnetic disc drive storage system of the invention.

FIG. 1 is a pictorial representation of a disc drive 10 that can utilize a perpendicular recording medium in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing, in this case a magnetic disc. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track of the disc 16. The actuator motor 28 is regulated by a controller, which is not shown in this view and is well known in the art.

Figure 2:
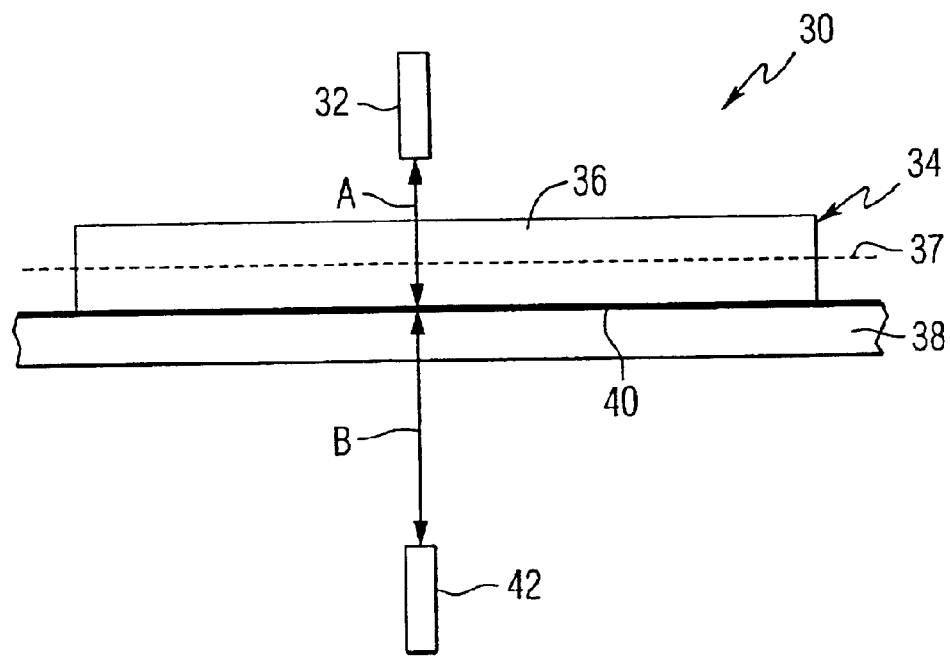
FIG. 2 is a magnetic image representation of a perpendicular magnetic recording system with a flat or horizontal soft magnetic underlayer boundary.

FIG. 2 is a magnetic image representation of a reader portion of a perpendicular magnetic recording head 30. The recording head 30 includes a read head or element 32, which may be a conventional MR reader, a GMR reader, or the like.

A perpendicular magnetic recording medium 34 is positioned beneath the recording head 30, and specifically beneath the read element 32. The recording medium 34 includes a hard magnetic recording layer 36 (having a center line 37) and a soft magnetic underlayer 38. Interlayers, not shown, may be positioned between the hard magnetic recording layer 36 and the soft underlayer 38. The soft magnetic underlayer includes a generally flat or generally horizontal boundary 40.

Still referring to FIG. 2, the recording head 30 includes a representative image head or element 42 which represents the image of the read element 32 as created by the soft magnetic underlayer 38. As shown, it has been determined that there is asymmetry between the read element 32 and the image element 42 with respect to the hard magnetic recording layer 36, as represented by arrows A and B, i.e. the read element 32 is spaced closer than the image head 42 to the recording layer 36. It has also been determined that due to this asymmetry, the resolution of the perpendicular recording head 30 that is used in conjunction with the perpendicular magnetic recording medium 34 having the soft magnetic underlayer 38 is never better than the resolution of a system that does not utilize the soft magnetic underlayer 38. Accordingly, this fundamental resolution degradation due to the use of the soft magnetic underlayer 38 is not desirable and limits the high density recording capabilities of a perpendicular recording system utilizing a soft magnetic underlayer.

Figure 3:
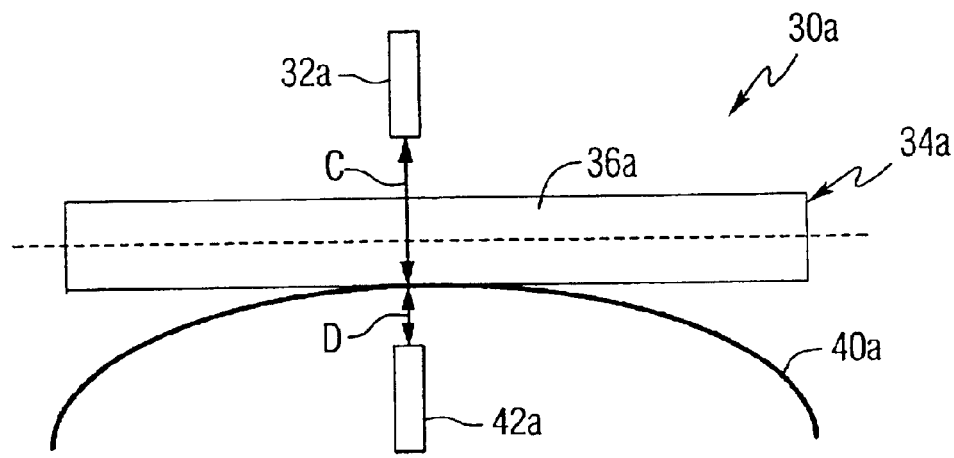
FIG. 3 is a magnetic image representation of a perpendicular magnetic recording system of the invention with a curved soft magnetic underlayer boundary.

FIG. 3 is a magnetic image representation of a perpendicular magnetic recording system constructed in accordance with the invention. Specifically, the perpendicular magnetic recording system includes a perpendicular magnetic recording head 30a which includes a read head or element 32a and an image head or element 42a. The recording head 30a is positioned adjacent a perpendicular magnetic recording medium 34a which includes a hard magnetic recording layer 36a and a soft magnetic underlayer boundary 40a. It has been determined that to overcome the asymmetry problem described herein and illustrated in FIG. 2, the image head 42a should be moved closer to the recording layer 36a. Specifically, the image head 42a will move closer to the magnetic recording layer 36a if the soft magnetic underlayer boundary 40a is generally curved. By curving the magnetic boundary 40a of the soft underlayer, the image head 42a can be moved significantly closer to the recording layer 36a, as indicated by arrows C and D. Specifically, by curving the boundary layer 40a, the distance between the image head 42a and the recording layer 36a, as represented by arrow D, can be made even smaller than the distance between the actual read element 32a and the recording layer 36a, as represented by arrow C. Therefore, the resolution of such a recording head 30a with the curved boundary 40a is improved in comparison with the resolution of a recording head without a soft magnetic underlayer.

Figure 4:
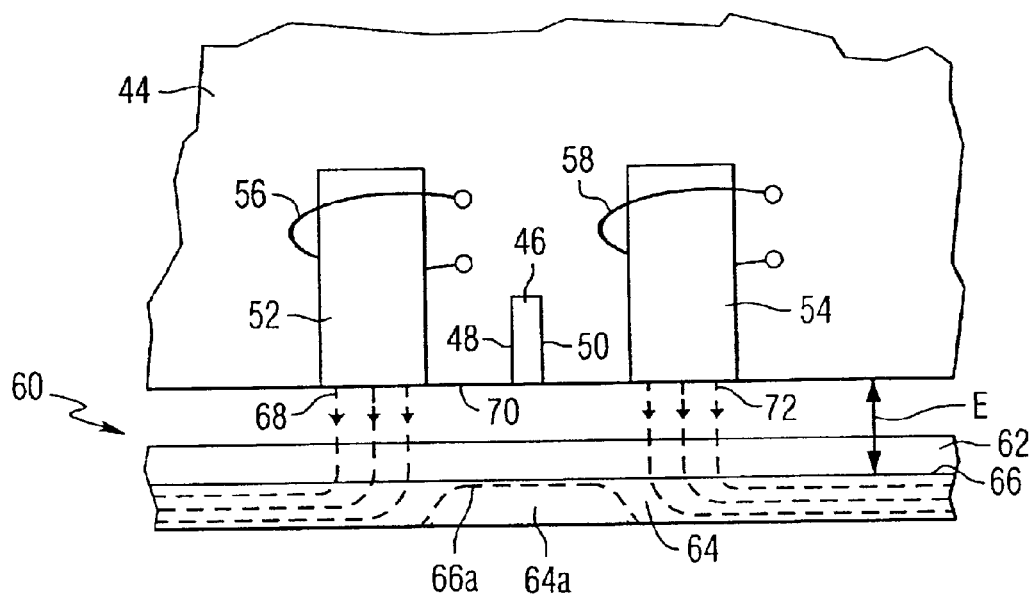
FIG. 4 is a partial schematic side view of the reader portion of a perpendicular magnetic recording head constructed in accordance with the invention.

FIG. 4 is a partially schematic side view of a reader portion of a perpendicular magnetic recording head 44, which may be, for example, the recording head 22 illustrated in FIG. 1. The recording head 44 includes a read element 46 having a first side 48 and a second side 50. The read element 46 may employ, for example, MR, GMR, or similar type read sensing technologies.

The recording head 44 also includes a first magnetic flux generating element 52 spaced apart from the first side 48 of the read element 46. The recording head 44 also includes a second magnetic flux generating element 54 spaced apart from the second side 50 of the read element 46. The first and second magnetic flux generating elements 52 and 54 respectively include an electrically conductive element or coil 56 and 58 for inducing a magnetic flux in the first and second magnetic flux generating elements 52 and 54. The first and second magnetic flux generating elements 52 and 54 may be made of any suitable material such as Permalloy, FeAlN, Fe/Co, Ni/Fe (45/55) and many other magnetically soft mono or laminated materials.

Still referring to FIG. 4, positioned adjacent to or beneath the recording head 44 is a magnetic recording medium 60. The magnetic recording medium 60 includes a hard magnetic recording layer 62 and a soft magnetic underlayer 64 for forming a recording medium suitable for perpendicular magnetic recording. The recording medium 60 may include additional interlayers (not shown) between the hard recording layer 62 and the soft underlayer 64. The soft magnetic underlayer includes a boundary layer 66 adjacent the hard magnetic recording layer 62. The hard magnetic recording layer 62 may be made of any suitable material, such as a CoCr compound, Co/Pd or Co/Pt multilayers, and many other sufficiently high anisotropy magnetic materials, and the soft underlayer may be made of any suitable material, such as Permalloy, FeAlN or FeTaN or other nitrides, or any other soft mono and laminated magnetic materials.

The electrically conductive element 56, as described, induces a magnetic flux in the first magnetic flux generating element 52. The first magnetic flux generating element 52 transmits a magnetic flux, as represented by arrows 68, which flows from an air-bearing surface 70 of the recording head 44, and specifically from the air-bearing surface of the element 52, into the recording layer 62 of the recording medium 60 and then into the soft underlayer 64. Similarly, the electrically conductive coil 58 induces a magnetic flux in the second magnetic flux generating element 54. The second magnetic flux generating element 54 transmits a magnetic flux, as represented by arrows 72, which flows from an air-bearing surface of the second magnetic flux generating element 54 into the recording layer 62 and then into the soft underlayer 64. The magnetic flux 68 from the first magnetic flux generating element 52 and the magnetic flux 72 from the second magnetic flux generating element 54 are chosen to have the same polarity which results in the magnetic flux 68 flowing in an opposite direction within the soft underlayer 64 from the direction of flow of the magnetic flux 72 in the soft underlayer 64.

The flux 68 flows into an area of the soft underlayer 64 that is adjacent an air-bearing surface of the first magnetic flux generating element 52. The amount of flux 68, i.e. the flux density, is selected so as to sufficiently saturate the designated area of the soft underlayer 64. Similarly, the flux 72 is transmitted to an area of the soft underlayer 64 adjacent the air-bearing surface of the second magnetic flux generating element 54. The amount of flux 72, i.e. the flux density, is selected to sufficiently saturate the designated area of the soft underlayer 64. Thus, the flux 68 and the flux 72 saturate the designated areas of the soft underlayer 64, but not an area 64a of the soft underlayer 64 that is beneath and/or adjacent an air-bearing surface of the read element 46. The area 64a is adjacent an area of the recording layer 62 where a read operation will be performed. As described, the flux 68 and the flux 72 are selected to have the same polarity in order that they will flow in opposite directions away from the area 64a. It will be appreciated that saturating the designated areas of the soft underlayers 64 with the flux 68 and the flux 72 effectively results in the soft underlayer boundary 66 being generally curved, as designated by line 66a. This has the effective result of improving the resolution of the recording head 44 as described in relation to FIG. 3.

In accordance with the invention, the air-bearing surface 70, and particularly the air-bearing surface of the first magnetic flux generating element 52 and the second magnetic flux generating element 54, is spaced from the boundary layer 60 by a distance of from about 5 nm to about 100 nm, as indicated by arrow E. The distance E is selected according to the most typical requirements set on any recording system, for example to satisfy a sufficiently small flying height for better read resolution. The thickness of each of the two flux generating elements, 52 and 54, is selected to provide a desirable saturation contour in the soft underlayer. A range for the thickness of the flux generating elements may be from about 10 nm to about 10,000 nm.

The directions of the electrical currents in the flux generating elements 52 and 54 are chosen such that the magnetic flux emanating from the two elements flows in the same generally vertical direction. The same direction flow is necessary to provide the desired generally convex type contour for the saturation boundary curve, 66a, which separates the saturated regions from the locally non-saturated region, 64a, positioned generally under the head 46.

Figure 5:
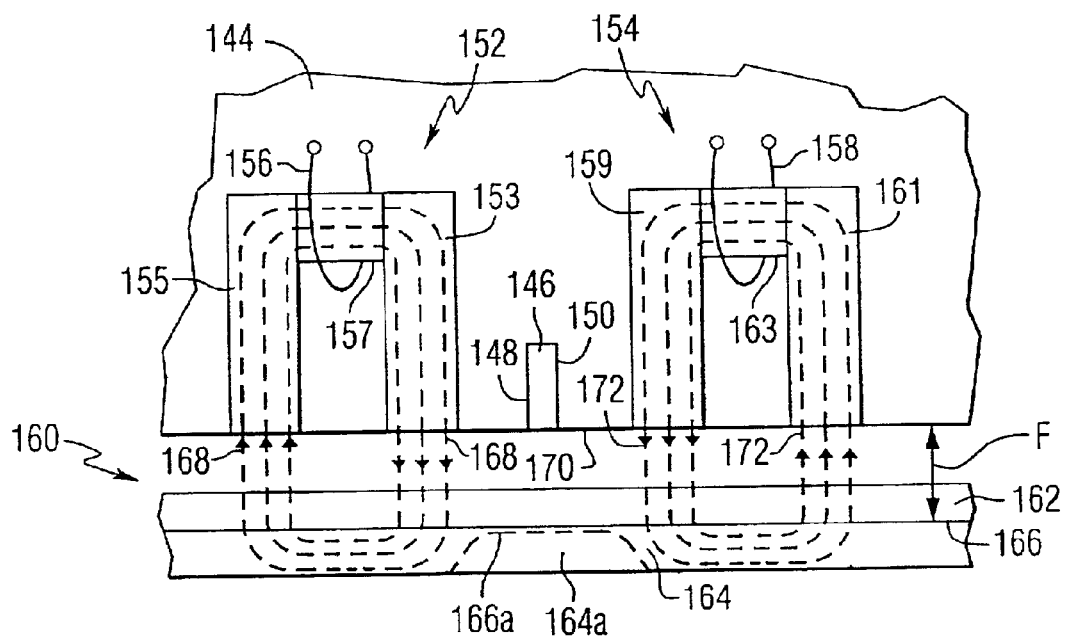
FIG. 5 is a partial schematic side view of an additional embodiment of the reader portion of a perpendicular magnetic recording head constructed in accordance with the invention.

FIG. 5 is a partially schematic side view of a reader portion of an additional embodiment of a perpendicular magnetic recording head 144, which may be for example the recording head 22 illustrated in FIG. 1. The recording head 144 is similar in some aspects to the recording head 44, described herein, and such similarities will not be described again in detail for simplicity.

The recording head 144 includes a read element 146 having a first side 148 and a second side 150. The recording head 144 also includes a first magnetic flux generating element, generally designated by reference number 152, that is spaced apart from the first side 148 of the read element 146. More specifically, the first magnetic flux generating element 152 includes an inner magnetic element 153 and an outer magnetic element 155, wherein the inner magnetic element 153 is spaced apart from the first side 148 of the read element 146, and the inner magnetic element 153 is positioned between the read element 146 and the outer magnetic element 155. The inner magnetic element 153 and the outer magnetic element 155 may be magnetically connected by a yoke 157 extending therebetween. In addition, the first magnetic flux generating element 152 includes an electrically conductive element or coil 156 for inducing a magnetic flux in the first magnetic generating element 152.

Similarly, the second magnetic flux generating element 154 includes an inner magnetic element 159, an outer magnetic element 161 and a yoke 163 extending therebetween for magnetically connecting the inner magnetic element 159 and the outer magnetic element 161. The inner magnetic element 159 is spaced apart from the second side 150 of the read element 146 and positioned between the read element 146 and the outer magnetic element 161. The second magnetic flux generating element 154 also includes an electrically conductive element or coil 158 for inducing a magnetic flux in the second magnetic flux generating element 154.

Positioned adjacent to or beneath the recording head 144 is a magnetic recording medium 160. The magnetic recording medium 160 includes a hard magnetic recording layer 162 and a soft magnetic underlayer 164. The recording medium 160, therefore, is structured for perpendicular magnetic recording. The soft magnetic underlayer 164 includes a boundary layer 166 adjacent the recording layer 162.

The first magnetic flux generating element 152 transmits a magnetic flux, as represented by arrows 168, from the inner magnetic element 153. The magnetic flux 168 flows from an air-bearing surface 170 of the recording head 144, and specifically from the air-bearing surface of the element 153, into the recording layer 162 of the recording medium 160 and into the soft underlayer 164. The magnetic flux 168 travels within the soft underlayer 164 and passes back through the recording layer 162 and flows into the outer magnetic element 155 of the first magnetic flux generating element 152. The flux path continues from the outer magnetic element 155 through the yoke 157 and back to the inner magnetic element 153. Similarly, the second magnetic flux generating element 154 transmits a magnetic flux, as represented by arrows 172, from the inner magnetic element 159. The magnetic flux 172 flows from an air-bearing surface of the inner magnetic element 159 into the recording layer 162 and into the soft underlayer 164. The magnetic flux 172 travels within the soft underlayer 164 and passes back through the recording layer 162 and into the outer magnetic element 161. The flux path continues from the outer magnetic element 161 through the yoke 163 and back to the inner magnetic element 159. It will be appreciated that the direction of flow or polarity for the flux 168 or the flux 172 may be reversed in accordance with the invention.

The flux 168 flows into the recording medium 160 so as to sufficiently saturate the soft underlayer 164 in an area generally adjacent to or beneath the inner magnetic element 153 and the outer magnetic element 155, and therebetween. Similarly, the flux 172 flows into the recording medium 160 so as to sufficiently saturate the soft underlayer 164 in an area generally adjacent to or beneath the inner magnetic element 159 and the outer magnetic element 161, and therebetween. Thus, the flux 168 and the flux 172 saturates the described or designated areas of the soft underlayer 164 but does not saturate the area 164a of the soft underlayer 64 that is positioned generally beneath and/or generally adjacent to the air-bearing surface of the read element 146. The area 164a is adjacent an area of the recording layer 162 where a read operation will be performed. It will be appreciated that by saturating the described areas of the soft underlayer 164 with the flux 168 and the flux 172, the effective result is that the soft underlayer boundary 166 is generally curved, as designated by line 166a. This has the effective result of improving the resolution of the recording head 144 in a manner similar to the description set forth herein in relation to FIG. 3.

In accordance with the invention, the air-bearing surface 170, and particularly the air-bearing surface of the first magnetic flux generating element 152 and the second magnetic flux generating element 154, is spaced from the boundary layer 160 by a distance of from about 5 nm to about 100 nm, as indicated by arrow F. This distance F is selected according to the same principle as the distance E in the previous embodiment. Similarly, the ABS thicknesses of the flux generating elements 152 and 154 are chosen so that the desired area in the soft underlayer 164 is saturated to provide the correct saturation contour, and in order to most effectively saturate the designated areas of the soft underlayer 164 adjacent the area 164a, as described herein.

Due to the bi-polar structure of each of the flux generating elements, 152 and 154, there is a well defined effective path for the respective magnetic flux 168 and 172 to flow to define the saturated region. In turn, a better defined magnetic path means a better control of the saturation region, so the resolution is further improved. Also, a well defined magnetic path means a need for a relatively small amount of electrical current around each of the flux generating elements, 152 and 154, to saturate the region.

Figure 6:
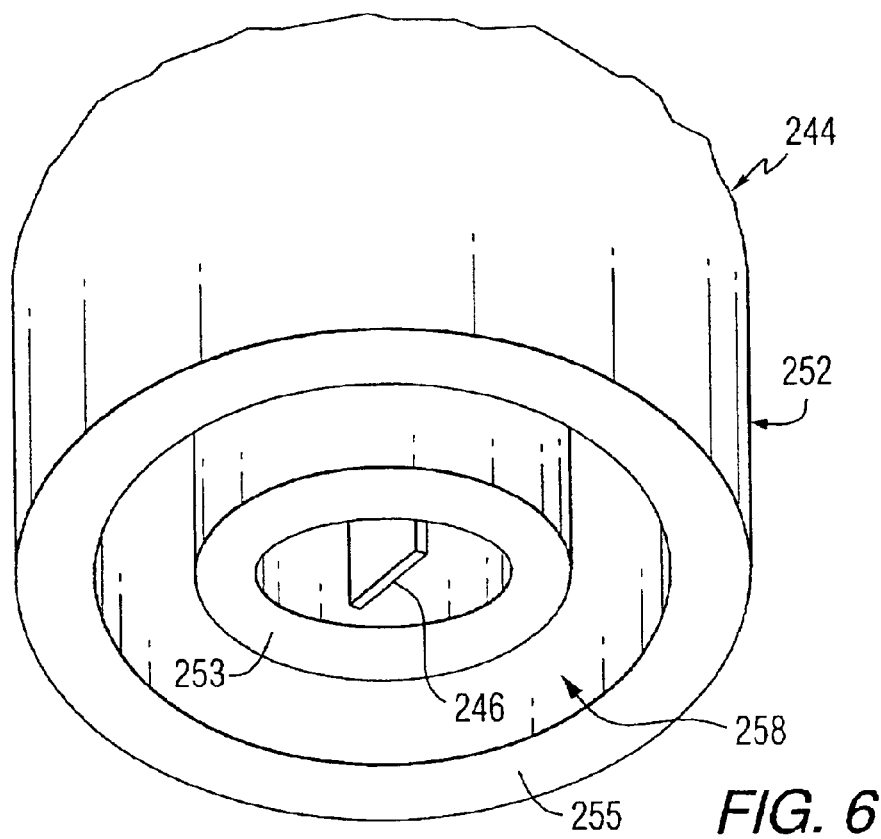
FIG. 6 is a schematic diagram illustrating an additional embodiment of the invention, and particularly the reader portion of a perpendicular magnetic recording head constructed in accordance with the invention.

FIG. 6 is partially schematic view of a reader portion of an additional embodiment of a perpendicular magnetic recording head 244 constructed in accordance with the invention. Specifically, the recording head 244 includes a read element 246 and a magnetic flux generating element, generally designated by reference number 252. The magnetic flux generating element 252 includes an inner magnetic element 253 and an outer magnetic element 255. The inner magnetic element 253 is spaced apart from the read element 246 and is positioned between the read element 246 and the outer magnetic element 255. The recording head 244 further includes an area, generally designated by arrow 258, where an electrically conductive element or coil may be positioned between and adjacent to the inner magnetic element 253 and outer magnetic element 255 for inducing a magnetic flux therein. The recording head 244 operates similar to the recording head 144, as described herein, and a magnetic flux induced in the inner magnetic element 253 may pass therefrom to a recording medium (not shown) and specifically into the soft magnetic underlayer for saturating a designated or selected area of the soft magnetic underlayer prior to the flux path returning to the outer magnetic element 255. The recording head 244 is an example of an embodiment of the invention where the magnetic flux generating element 252 is at least partially disposed about the read element 246. It will be appreciated, therefore, that the recording head 244 may be constructed as shown having the inner magnetic element 253 and the outer magnetic element 255 concentrically disposed relative to one another and circumferentially disposed about the read element 246 for saturating a selected area of the soft underlayer and improving the resolution of the recording head 244. In addition, other recording heads having various shapes and configurations similar to the embodiments described and disclosed herein, may also be utilized in accordance with the invention.

Figure 7:
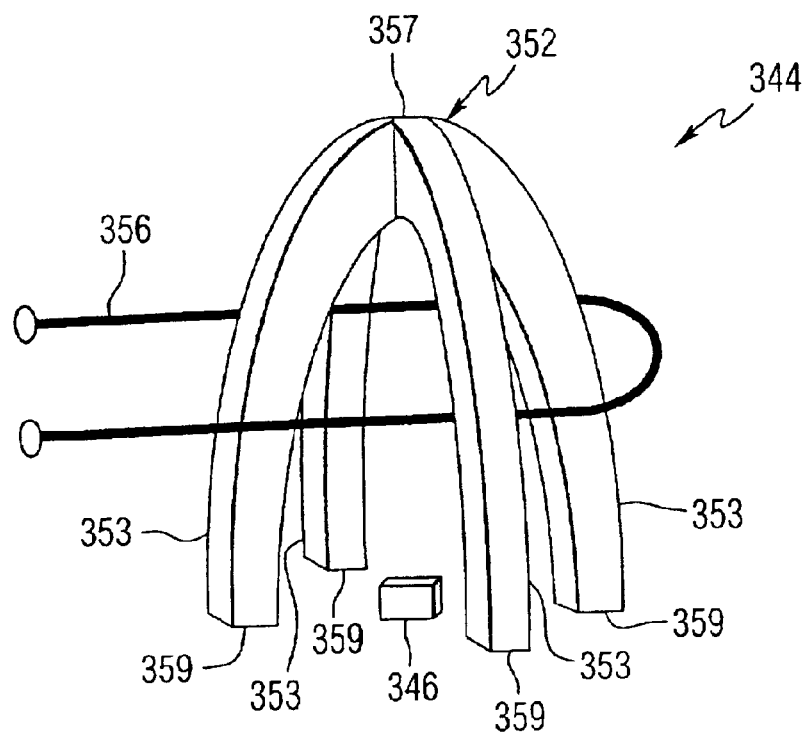
FIG. 7 is a schematic diagram illustrating an additional embodiment of the invention, and particularly the reader portion of a perpendicular magnetic recording head constructed in accordance with the invention.
Figure 8:
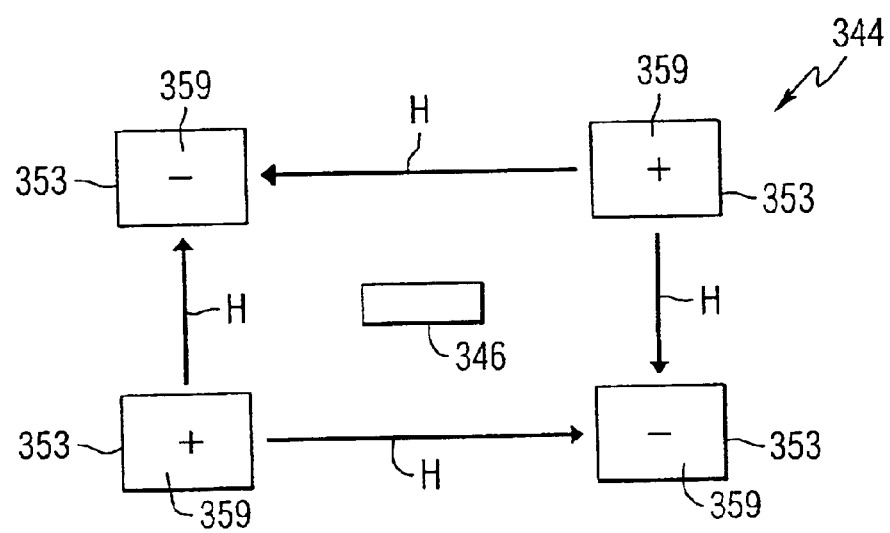
FIG. 8 is a partial schematic air-bearing surface view of the recording head illustrated in FIG. 7.

FIGS. 7 and 8 illustrate a partially schematic view of a reader portion of an additional embodiment of a perpendicular magnetic recording head 344 constructed in accordance with the invention. Specifically, the recording head 344 includes a read element 346 and a magnetic flux generating element, generally designated by reference number 352. The magnetic flux generating element 352 includes a plurality of magnetic elements 353 that are spaced apart from the reader 346 and disposed at least partially about the reader 346. The magnetic elements 353 are connected at an apex 357 thereof. At an opposing end of the magnetic elements 353, each magnetic element 353 terminates in a pole tip 359 at an air-bearing surface thereof. An electrically conductive coil or element 356 is positioned adjacent to or in proximity to the magnetic elements 353 to induce a magnetic flux in the magnetic flux generating element 352. The electrically conductive element 356 is positioned so as to create the magnetic charges in each magnetic element 353 with the polarity as shown, for example, in FIG. 8. This results in the magnetic flux emanating from the tips 359 in the directions illustrated by arrows H, as illustrated in FIG. 8.

Similar to the other embodiments of the invention, recording head 344 generates a magnetic field or flux around the reader 346 for saturating desired portions of the recording medium adjacent to an area of the recording medium beneath or adjacent to the reader 346 where a read operation will be performed. For example, the magnetic flux from the magnetic flux generating element 352 may have an in-plane field component of the order of 1 to 100 Oe such that the underlayer is sufficiently saturated around the reader 346. In addition, the pole tips 359 dimension at the air-bearing surface thereof is preferably larger than the dimensions of the read head and may be located so that the maximum flux is around the playback region. This configuration has a symmetry to saturate the desired region in the soft underlayer.

Figure 9:
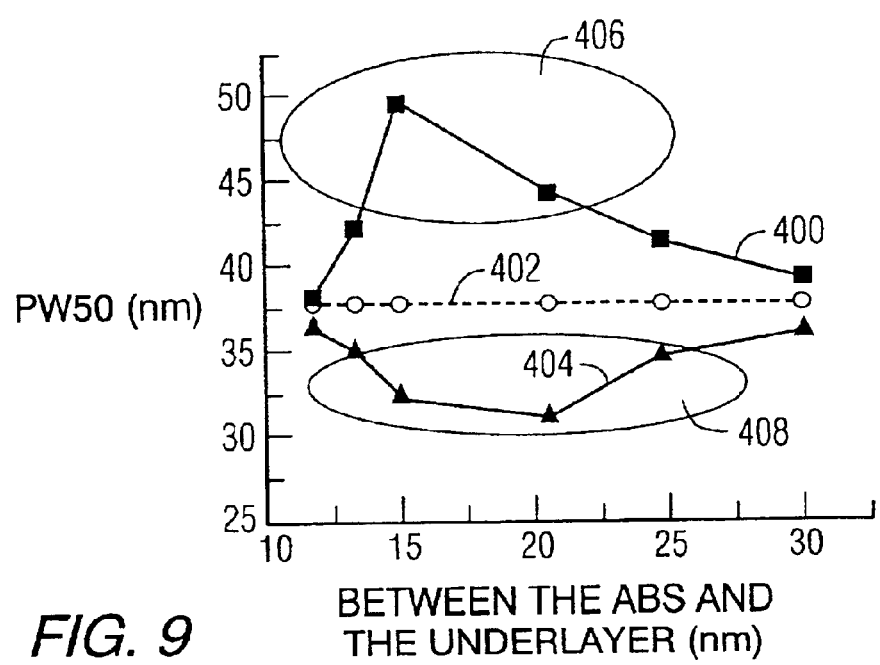
FIG. 9 is a graphical illustration of PW50 versus the distance between the air-bearing surface and soft underlayer for various magnetic recording heads.

FIG. 9 is a graphical illustration for a calculated value of PW50 versus the separation between the air-bearing surface and the soft magnetic underlayer, such as the distance represented by arrows E and F in FIGS. 4 and 5, respectively. (PW50 is a half width of the playback signal from a single transition in a recording medium. Therefore, the smaller the PW50, the better the resolution of the head.) FIG. 9 illustrates the results for three different recording heads. Specifically, line 400 illustrates the results for a perpendicular magnetic recording head used in conjunction with a recording medium having a soft underlayer, such as the system illustrated in FIG. 2. Line 402 illustrates the results for a recording head used in conjunction with a recording medium having no soft underlayer, which results in a constant PW50 value, as shown. Line 404 illustrates the results for a magnetic recording head, such as magnetic recording head 44, 144, or 244, which employs magnetic flux generating elements for saturating a designated area of the soft underlayer, as described herein. The region designated by reference number 406 in FIG. 9 has been determined to be a relatively "bad" region for performance results, whereas the region generally designated by reference number 408 has been determined to be a relatively "good" region for performance results. Specifically, the region 408, as shown, indicates a reduced PW50 value for a recording head constructed in accordance with the invention. As previously mentioned, the smaller PW50 means better resolution, and the better resolution, in turn, means the ability of the recording head to read the higher a real density of the recorded information.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. An apparatus comprising:
   a magnetic recording medium having a hard magnetic recording layer and a soft magnetic underlayer; and
   a perpendicular magnetic recording head comprising:
      a read element having a first side and a second side;
      a first magnetic flux generating element spaced apart from the first side of said read element, wherein said first magnetic flux generating element transmits a magnetic flux into the soft magnetic underlayer adjacent an air-bearing surface of the first magnetic flux generating element; and
      a second magnetic flux generating element spaced apart from the second side of said read element, wherein said second magnetic flux generating element transmits a magnetic flux into the soft magnetic underlayer adjacent an air-bearing surface of the second magnetic flux generating element, wherein the magnetic flux transmitted to the soft magnetic underlayer by the first magnetic flux generating element flows in an opposite direction within the soft magnetic underlayer than the flow of the magnetic flux transmitted to the soft magnetic underlayer by the second magnetic flux generating element.

2. The apparatus of claim 1, wherein the first and second magnetic flux generating elements are positioned adjacent an electrically conductive element which induces the magnetic flux in the first and second magnetic flux generating elements.

3. The apparatus of claim 1, wherein the magnetic flux transmitted to the soft magnetic underlayer by the first magnetic flux generating element flows in the soft magnetic underlayer away from an area of the soft magnetic underlayer beneath the read element.

4. The apparatus of claim 1, wherein the magnetic flux transmitted to the soft magnetic underlayer by the second magnetic flux generating element flows in the soft magnetic underlayer away from an area of the soft magnetic underlayer beneath the read element.

5. The apparatus of claim 1, wherein the first and second magnetic flux generating elements include at least one material selected from the group consisting of Permalloy, FeAlN, Fe/Co and Ni/Fe (45/55).

6. A magnetic disc drive storage system, comprising:
   a housing;
   a magnetic recording medium having a hard magnetic recording layer and a soft magnetic underlayer; and
   a perpendicular magnetic recording head positioned adjacent the magnetic recording medium, the recording head comprising:
      a read element having a first side and a second side;
      a first magnetic flux generating element spaced apart from the first side of said read element, wherein said first magnetic flux generating element transmits a magnetic flux into the soft magnetic underlayer adjacent an air-bearing surface of the first magnetic flux generating element; and
      a second magnetic flux generating element spaced apart from the second side of said read element, wherein said second magnetic flux generating element transmits a magnetic flux into the soft magnetic underlayer adjacent an air-bearing surface of the second magnetic flux generating element, wherein the first and second magnetic flux generating elements improve the resolution of the recording head, wherein the magnetic flux transmitted to the soft magnetic underlayer by the first magnetic flux generating element flows in an opposite direction within the soft magnetic underlayer than the flow of the magnetic flux transmitted to the soft magnetic underlayer by the second magnetic flux generating element.

7. The magnetic disc drive storage system of claim 6, wherein an air-bearing surface of the first and second magnetic flux generating elements is spaced from a boundary layer of the soft magnetic underlayer a distance of from about 5 nm to about 10 nm.

8. The magnetic disc drive storage system of claim 6, wherein the flux transmitted to the soft magnetic underlayer is concentrated in an area of the soft magnetic underlayer beneath at least one magnetic flux generating element.

9. The magnetic disc drive storage system of claim 6, wherein the flux transmitted to the soft magnetic underlayer has the effect of curving a boundary layer of the soft magnetic underlayer.

10. An apparatus comprising:
    a magnetic recording medium having a hard magnetic recording layer and a soft magnetic underlayer; and
    a perpendicular magnetic recording head comprising:
       a read element having a first side and a second side;

a first magnetic flux generating element spaced apart from the first side of said read element, wherein said first magnetic flux generating element transmits a magnetic flux into the soft magnetic underlayer adjacent an air-bearing surface of the first magnetic flux generating element; and a second magnetic flux generating element spaced apart from the second side of said read element, wherein said second magnetic flux generating element transmits a magnetic flux into the soft magnetic underlayer adjacent an air-bearing surface of the second magnetic flux generating element, wherein the first magnetic flux generating element includes an inner magnetic element and an outer magnetic element, said inner magnetic element spaced apart from the first side of said read element and positioned between said read element and said outer magnetic element.

11. The apparatus of claim 10, wherein the first magnetic flux generating element further includes a yoke that magnetically connects the inner magnetic element and the outer magnetic element.

12. The apparatus of claim 10, wherein the flux transmitted to the soft magnetic underlayer is concentrated in an area of the soft magnetic underlayer beneath the inner and outer magnetic elements and therebetween.

13. The apparatus of claim 10, wherein the inner magnetic element and outer magnetic element are positioned adjacent an electrically conductive element which induces the magnetic flux in the inner and outer magnetic elements.

14. The apparatus of claim 10, wherein the second magnetic flux generating element includes an inner magnetic element and an outer magnetic element, said inner magnetic element spaced apart from the second side of said read element and positioned between said read element and said outer magnetic element.

15. The apparatus of claim 14, wherein the second magnetic flux generating element further includes a yoke that magnetically connects the inner magnetic element and the outer magnetic element.

16. The apparatus of claim 14, wherein the flux transmitted to the soft magnetic underlayer is concentrated in an area of the soft magnetic underlayer beneath the inner and outer magnetic elements and therebetween.

17. The apparatus of claim 14, wherein the inner magnetic element and outer magnetic element are positioned adjacent an electrically conductive element which induces the magnetic flux in the inner and outer magnetic elements.

* * * * *